(12) United States Patent
Phillips et al.

(10) Patent No.: US 6,735,502 B2
(45) Date of Patent: *May 11, 2004

(54) CONTROL SYSTEM AND METHOD FOR A PARALLEL HYBRID ELECTRIC VEHICLE

(75) Inventors: Anthony Mark Phillips, Northville, MI (US); Kathleen Ellen Bailey, Dearborn, MI (US); Miroslava Jankovic, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/966,612

(22) Filed: Oct. 1, 2001

(65) Prior Publication Data

US 2003/0098187 A1 May 29, 2003

(51) Int. Cl.[7] ................................................. B60L 11/02
(52) U.S. Cl. ........................ 701/22; 180/165; 180/65.2; 477/2
(58) Field of Search ............................ 701/22; 180/65.1, 180/65.2, 65.3, 65.4, 65.6, 65.7, 165; 318/138, 376, 368, 432; 60/716, 718; 290/40 C, 32, 16, 40 A, 40 B, 2, 5, 3

(56) References Cited

U.S. PATENT DOCUMENTS

| | | | |
|---|---|---|---|
| 4,407,132 A | 10/1983 | Kawakatsu et al. | 180/65.4 |
| 5,343,970 A | 9/1994 | Severinsky | 180/65.2 |
| 5,820,172 A | 10/1998 | Brigham et al. | 290/40 C |
| 5,856,709 A | 1/1999 | Ibaraki et al. | 290/45 |
| 5,873,426 A | 2/1999 | Tabata et al. | 180/65.7 |
| 5,898,282 A | 4/1999 | Drozdz et al. | 318/139 |
| 5,939,794 A * | 8/1999 | Sakai et al. | 290/40 A |
| 5,984,033 A | 11/1999 | Tamagawa et al. | 180/65.2 |
| 6,203,468 B1 * | 3/2001 | Nitta et al. | 477/5 |
| 6,209,672 B1 * | 4/2001 | Severinsky | 180/65.2 |
| 6,242,873 B1 * | 6/2001 | Drozdz et al. | 318/139 |
| 6,249,723 B1 * | 6/2001 | Lutz | 701/22 |
| 6,321,143 B1 * | 11/2001 | Phillips et al. | 701/22 |
| 6,333,612 B1 * | 12/2001 | Suzuki et al. | 318/432 |
| 6,356,817 B1 * | 3/2002 | Abe | 701/22 |

OTHER PUBLICATIONS

Fundamental of Logic Design, pp478–479, by Charles H. Roth, Jr.*

* cited by examiner

*Primary Examiner*—Yonel Beaulieu
(74) *Attorney, Agent, or Firm*—Brooks & Kushman; Carlos Hanze

(57) ABSTRACT

A vehicle system controller for a vehicle having an engine, a motor/generator, and subsystem controllers is provided. The vehicle system controller includes a state machine having a number of predefined states which represent vehicle operating modes. The predefined states include a motor drive state, which represents a vehicle operating mode wherein the motor/generator provides all driveline torques. The vehicle system controller further includes a set of rules which define logical relationships between each of the predefined states. A set of commands, unique to each state, are supplied to the subsystem controllers. The commands are provided to the subsystem controllers to achieve desired vehicle functionality within the states, and to transition between different states.

20 Claims, 2 Drawing Sheets

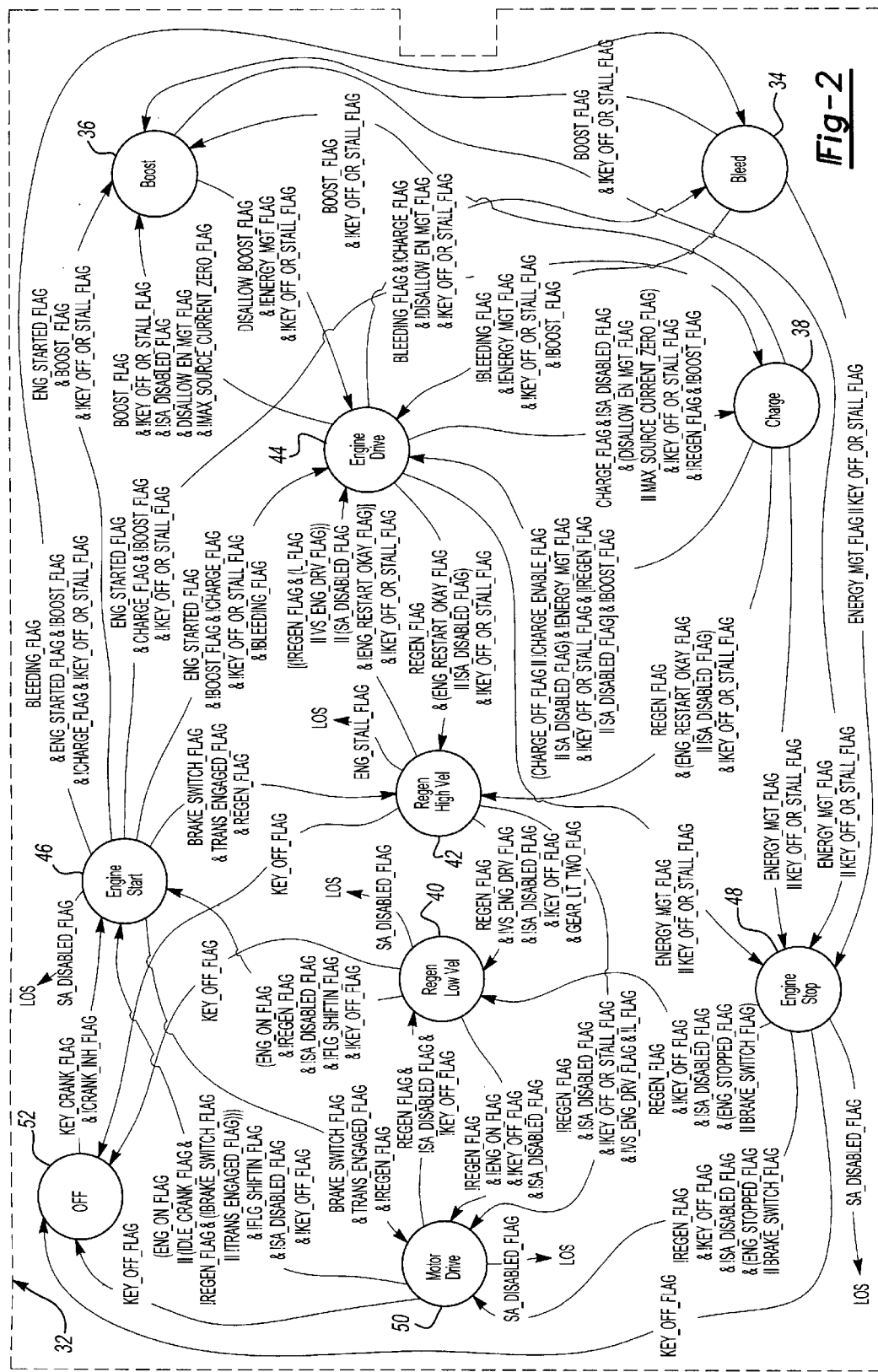

CONTROL SYSTEM AND METHOD FOR A PARALLEL HYBRID ELECTRIC VEHICLE

BACKGROUND OF THE INVENTION

1. Field of Invention

The present invention relates generally to a control system and method for a hybrid electric vehicle (HEV), and specifically to a strategy to control and transition between operating states in a parallel HEV.

2. Discussion of the Prior Art

The need to reduce fossil fuel consumption and pollutants from automobiles and other vehicles powered by internal combustion engines (ICEs) is well known. Vehicles powered by electric motors have attempted to address these needs. However, electric vehicles have limited range and limited power coupled with the substantial time needed to recharge their batteries. An alternative solution is to combine both an ICE and electric traction motor into one vehicle. Such vehicles are typically called hybrid electric vehicles (HEV's). See generally, U.S. Pat. No. 5,343,970 to Severinsky.

The HEV has been described in a variety of configurations. Some HEV patents disclose systems where an operator is required to select between electric and internal combustion operation. In other configurations the electric motor drives one set of wheels and the ICE drives a different set.

Other, more useful, configurations have developed. A series hybrid electric vehicle (SHEV) is a vehicle with an engine (most typically an ICE), which powers a generator. The generator, in turn, provides electricity for a battery and motor coupled to the drive wheels of the vehicle. There is no mechanical connection between the engine and the drive wheels. A parallel hybrid electrical vehicle (PHEV) is a vehicle with an engine (most typically an ICE), battery, and electric motor combined to provide torque or power the wheels of the vehicle.

A parallel/series hybrid electric vehicle (PSHEV) has characteristics of both the PHEV and the SHEV. The PSHEV is also known as a torque (or power) splitting powertrain configuration. Here, the torque output of the engine is given in part to the drive wheels and in part to an electrical generator. The generator powers a battery and motor that also provide torque output. In this configuration, torque output can come from either source or both simultaneously. The kinetic energy of the vehicle can be captured by the generator where it is converted to a charge that is sent to the battery (regenerative braking).

The desire of combining the ICE with an electric motor is clear. The ICE's fuel consumption and pollutants are reduced with no appreciable loss of performance or vehicle range. A major benefit of parallel HEV configurations is that the engine can be turned off during periods of low or no power demand from the operator (e.g., waiting for a traffic light). This improves fuel economy by eliminating wasted fuel used during idle conditions. The motor can then propel the vehicle under conditions of low power demand. In most configurations, the engine can be disconnected from the motor and powertrain when it is not running by opening a disconnect clutch. As power demand increases, the engine can be restarted and reconnected to provide the requested torque.

Developing a strategy to control a parallel HEV is needed for successful implementation of a parallel HEV. HEV control strategies are known in the prior art. For example, U.S. Pat. No. 5,984,033 to Tamagawa et al. proposes a pre-transmission hybrid electric vehicle but there is no means to disconnect the internal combustion engine from the electric motor. This limits the vehicle operation and goals for a successful HEV strategy. Further, Tamagawa et al. does not provide a logical structure (such as a state machine) for determining different vehicle operating modes and only three modes of operation are allowed: assist, regenerative, and zero output. Other modes of operation, including engine stopping and starting, are not included. U.S. Pat. No. 5,898,282 to Drozdz et al. describes a series HEV control system. The control strategy only describes three main operating modes: high load driving condition (HLDC), low load driving condition (LLDC), and regenerative braking (RB).

Other U.S. patents also cover limited HEV controllers. See generally, U.S. Pat. No. 4,407,132 (but has no strategy to optimize fuel consumption), U.S. Pat. No. 5,856,709 to Ibaraki et al. (but only for a post-transmission HEV configuration, i.e., motor/generator after the transmission in the vehicle powertrain); U.S. Pat. No. 5,873,426 to Tabata et al. (also a pre-transmission HEV configuration controller). Finally, see U.S. Pat. No. 6,583,599 issued to Phillips et al. on Jun. 24, 2003. This patent describes a parallel HEV configuration control system, but only has six possible vehicle states since it is not designed to control the latest parallel HEV configurations where the electric motor/generator is rated to propel the vehicle independent of the ICE and the ICE can be disconnected from the powertrain.

In summary, there is a need for a comprehensive controller for a parallel HEV that can add drive states that do not include use of the ICE and maximize vehicle fuel economy.

SUMMARY OF THE INVENTION

Accordingly, the present invention provides a control strategy for a parallel hybrid electric vehicle (HEV) configuration that has a logical structure defining main system operating modes (states) as well as the transition between the different states. The HEV is configured so that power from the engine and the motor can (independently) provide torque to the vehicle powertrain.

The present invention describes a vehicle system controller for a parallel HEV that has a state machine having a plurality of predefined states representing the vehicle operating modes; a set of rules defining logical relationships between each of the plurality of predefined states; a set of commands unique to each state supplied to the subsystem controllers to achieve desired vehicle functionality within the states; and a set of transition conditions between the plurality of predefined states.

The predefined states can be prioritized according to operator demands, energy management requirements, and system fault occurrences. In general, the system defines system fault occurrences as a first priority, operator demands as a second priority, and energy demands as a third priority. In the event system performance is being compromised, the system can also be configured to have system fault occurrences as a first priority, energy demands as a second priority, and operator demands as a third priority.

The present invention can also be configured to have at least one of a plurality of transition flags. Each transition flag represents a logical relationship associated with sensed vehicle operating status, operator demand, or system faults.

Additionally, in the present invention the plurality of predefined states representing operating modes can be configured to include a BLEED state, BOOST state, CHARGE state, REGEN LOW VEL state, REGEN HIGH VEL state, ENGINE DRIVE state, ENGINE START state, ENGINE STOP state, MOTOR DRIVE state, and OFF state.

Other objects of the present invention will become more apparent to persons having ordinary skill in the art to which the present invention pertains from the following description taken in conjunction with the accompanying figures.

BRIEF DESCRIPTION OF THE FIGURES

The foregoing objects, advantages, and features, as well as other objects and advantages, will become apparent with reference to the description and figures below, in which like numerals represent like elements and in which:

FIG. 2 shows an HEV vehicle system controller (VSC) state machine

DETAILED DESCRIPTION OF PREFERRED EMBODIMENT

Figure 1:
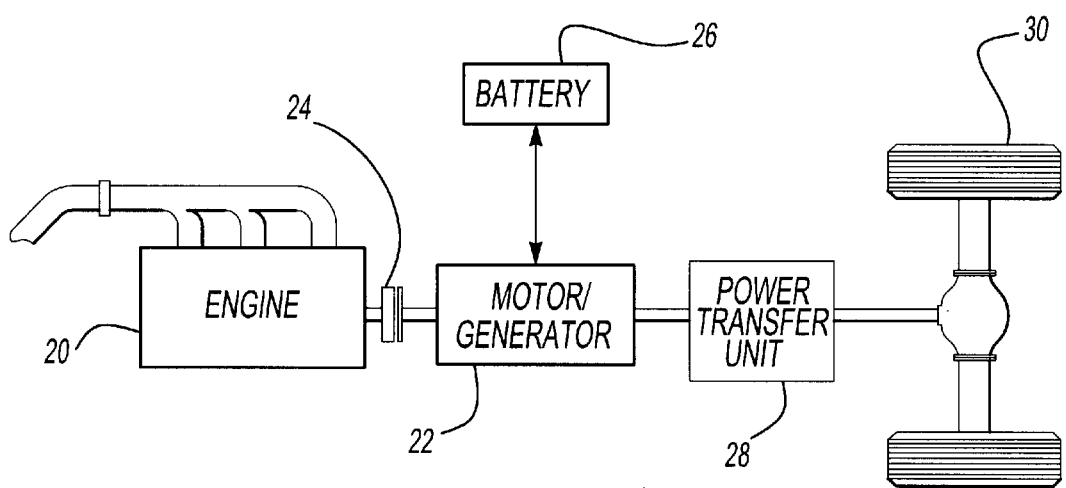
FIG. 1 shows a general parallel hybrid electric vehicle (HEV) configuration.

The present invention generally relates to hybrid electric vehicles (HEVs). Although the embodiment described is for a parallel HEV, the invention could be applied to any vehicle using a motor and an internal combustion engine (ICE or engine) to provide vehicle torque or drive. The ICE can be a gasoline engine, diesel engine, or turbine engine. The powertrain (or drivetrain or driveline) also has an engine disconnect clutch.

FIG. 1 shows general components of a parallel HEV powertrain with an engine disconnect clutch. An engine 20, is linked to a motor/generator 22, via a disconnect clutch 24. A battery 26 connects to the motor/generator 22 to allow the flow of electrical current to and from the two components. The motor/generator 22 is connected to a powertrain power transfer unit 28 (such as an automatic transmission, a planetary gear set (power-split), or an electronic converterless transmission), that is connected to a vehicle's wheels 30. Thus, torque energy flows from the engine 20 and motor/generator 22 through the power transfer unit 28 to the wheels 30.

In this configuration, both the engine 20 and the motor/generator 22 can be directly coupled to the wheels 30, so that both power sources can (independently) provide torque to the vehicle powertrain. The configuration shown in FIG. 1 employs the disconnect clutch 24 between the engine 20 and the motor/generator 22 to allow a temporary disconnection of the engine 20 from the motor/generator 22, and the wheels 30. The motor/generator 22, in addition to propelling the vehicle, can also be operated as a generator for use in charging the battery 26 using the engine 20 or through regenerative braking known in the prior art.

The present invention is a strategy to control a parallel HEV and is illustrated in FIG. 2. Several functions need implementation at a vehicle level to allow the HEV to operate efficiently and effectively. The three most fundamental functions are: 1) transfer of motor/generator 22 and engine 20 torque to the wheels 30 (based on operator demand); 2) efficient management of energy from the battery 26 and the combustible fuel; and 3) system fault management.

A vehicle system control algorithm (VSC) 32 is used to implement these fundamental functions using two primary control components. The first component is a logical state machine that defines a state for each predefined operating mode states of the vehicle and a set of rules defining logical relationships between each plurality of predefined states and used for transitions between states as part of a logical state machine. The second component of the VSC 32 is a set of output commands to the vehicle subsystem controllers (not shown) based on sensed vehicle operation status unique to each state defined within the VSC's 32 state machine. The commands achieve desired vehicle functionality within the states and transition between the plurality of predefined states. The present invention describes the logic strategy of the VSC 32 that can be used to control a parallel HEV.

FIG. 2 illustrates ten potential vehicle states representing operating modes of the present invention as follows: BLEED state 34, BOOST state 36, CHARGE state 38, REGEN LOW VEL state 40, REGEN HIGH VEL state 42, ENGINE DRIVE state 44, ENGINE START state 46, ENGINE STOP state 48, MOTOR DRIVE state 50, and OFF state 52. FIG. 2 can be referred to as a state machine, a term well known in the prior art.

In the BLEED state 34, the motor/generator 22 is used to provide torque to the vehicle powertrain (or driveline) to dissipate energy from the battery 26. This can occur for energy management reasons such as the battery 26 state of charge (SOC) is too high. The engine 20 output torque command is reduced by an amount necessary to offset an increase torque provided by the motor/generator 22. The operation is transparent to the operator.

In the BOOST state 36, the motor/generator 22 is used to provide supplemental torque to the driveline in an attempt to meet the operator's demand should the demanded torque be greater than the engine 20 alone is capable of providing.

In the CHARGE state 38, the motor/generator 22 is used as a generator to provide energy to charge the battery 26. Here, the engine 20 drives the motor/generator 22. The engine 20 output torque is increased over the operator demanded amount by the amount necessary to drive the motor/generator 22 to charge the battery 26. Again, the operation is seamless to the vehicle operator.

In the present invention, there are two regenerative states REGEN LOW VEL state 40 and REGEN HIGH VEL state 42. These two states occur when the motor/generator 22 is used as a generator to provide energy to charge the battery 26. The wheels 30 during vehicle coast or deceleration drive the motor/generator 22. The choice between the two regenerative states depends on vehicle velocity and other predetermined variables and is more particularly described in Ford Global Technologies' disclosure 200-0076) U.S. patent application Ser. No. 09/709,607.

There are three engine 20 states. In the ENGINE DRIVE state 44 the VSC 32 commands torque from the engine 20 to meet operator demand. In the ENGINE START state 46 and the ENGINE STOP state 48 the engine 20 is started (with the motor/generator 22) or stopped based on operator demand, energy management considerations, or fault management.

In the MOTOR DRIVE state 50, the motor/generator 22 is used to provide all driveline torque based on operator demand less than some calibratable level.

Finally, the OFF state 52 is the base mode for the vehicle, such as when a key is switched off (known as KEY_OFF). Any situations not covered by the state machine of FIG. 2 are considered limited operation situations (LOS) and are handled by a separate part of the VSC 32.

In addition to the ten states for the present invention, there are several conditions used to determine transitions between states. These conditions are called "flags." The flags for the present invention are shown in FIG. 2 and include a: BLEEDING_FLAG, BOOST_FLAG, BRAKE_

SWITCH_FLAG, CHARGE_ENABLE_FLAG, CHARGE_FLAG, CHARGE_OFF_FLAG, CRANK_INH_FLAG, DISALLOW_BOOST_FLAG, DISALLOW_EN_MGT_FLAG, ENERGY_MGT_FLAG, ENG_ON_FLAG, ENG_RESTART_OK_FLAG, ENG_STARTED_FLAG, ENG_STOPPED_FLAG, FLG_SHIFTIN_FLAG, IDLE_CRANK_FLAG, L_FLAG, KEY_CRANK_FLAG, KEY_OFF_FLAG, KEY_ON_FLAG, MAX_SOURCE_CURRENT_ZERO_FLAG, REGEN_FLAG, SA_DISABLED_FLAG, STALL_FLAG, TRANS_ENGAGED_FLAG, and a VS_ENG_DRV_FLAG. Definitions of these flags depend on the vehicle operating conditions, system fault status, and driver demand considerations. Defining these flags can be very complicated and the descriptions that follow present only one possible embodiment to help understand the present invention. Other definitions would be possible to one skilled in the art capable of defining flags necessary for the transitions between the operating states. Further, the transition flags are true and false depending on the current vehicle operating states, operator demand and system fault states.

There are several symbols and terms used throughout this disclosure and known in the prior art that are defined as follows:

| Term/Symbol: | Definition: |
|---|---|
| & | logical AND |
| \|\| | logical OR |
| ! | logical NOT |
| AC | air-conditioning |
| ACCEL_PEDAL | vehicle accelerator such as an accelerator pedal |
| CLU or CL | clutch |
| CTRL | control |
| CUR | current |
| DD | driver demand |
| DES | desired |
| DIS | disconnect |
| DRV | drive |
| ENG | engine |
| FHS | Ford Hybrid System |
| GR | gear (power transfer unit) |
| INP | input |
| KPH | kilometers per hour |
| L | low gear |
| LL | lower limit |
| LT | less than |
| MGT | management |
| Nm | Newton-meters |
| POS | position |
| PRNDL | gear shifter (park, reverse, neutral, drive, low) |
| REGEN | regenerative state |
| REQ | required |
| RPM | revolutions per minute |
| SA | starter-alternator (i.e. motor) |
| SPD | speed |
| SOC | state of charge |
| THRESH | threshold |
| TOL | tolerance |
| TRANS | transmission |
| TQ | torque |
| UL | upper limit |
| VS | vehicle speed |

The flags specified above represent the status of vehicle operating conditions or combinations of several operating conditions. Basic flags representing vehicle operating conditions are defined as follows:

| Condition: | Flag: | Definition: |
|---|---|---|
| SA_STATUS = 0 \|\| SA_STATUS = 8 | SA_DISABLED_FLAG = 1 | Motor is temporarily disabled |
| SOC >= SOC_REGEN_OFF | REGEN_OFF_FLAG = 1 | Regen is no longer allowed due to high SOC |
| SOC < SOC_CHARGE_OFF | CHARGE_ON_FLAG = 1 | Charging is required due to low SOC |
| (SOC > SOC_CHARGE_OFF) \|\| MAX_SINK_CURRENT_ZERO_FLAG | CHARGE_OFF_FLAG = 1 | Charging is no longer required due to high SOC or the battery cannot sink any current |
| SOC <= SOC_BLEED_OFF | BLEEDING_FLAG = 0 | Bleeding is not required due to low SOC |
| SOC > SOC_BLEED_OFF | BLEEDING_FLAG = 1 | Bleeding is required due to high SOC |
| SOC < SOC_BOOST_OFF | BOOST_OFF_FLAG = 1 | SOC is too low to allow boost |
| SOC > SOC_BOOST_OK | BOOST_OK_FLAG = 1 | SOC is high enough to allow boost |
| SOC < SOC_ENG_RUN | SOC_ENG_RUN_FLAG = 1 | SOC is too low to allow engine to be turned off |
| SOC > SOC_ENG_OFF | SOC_ENG_OFF_FLAG = 1 | SOC is high enough to allow engine to be turned off |

-continued

| Condition: | Flag: | Definition: |
|---|---|---|
| ACCEL_PEDAL > PEDAL_ON (>0) | PEDAL_FLAG = 1 | Accelerator indicates positive operator demand |
| ACCEL_PEDAL < PEDAL_OFF (=0) | PEDAL_FLAG = 0 | Accelerator indicates zero operator demand |
| DES_TRANS_INP_PWR > POWER_THRESH_ON | ENG_ON_FLAG = 1 | Operator requested power is high enough to require an engine start |
| DES_TRANS_INP_PWR < POWER_THRESH_OFF | ENG_ON_FLAG = 0 | Operator requested power is low enough to allow the engine to turn off |
| GR_CUR <> 0 | TRANS_ENGAGED_FLAG = 1 | Transmission is engaged |
| GR_CUR = 5 | REVERSE_GEAR_FLAG = 1 | Transmission is in reverse |
| GR_CUR < 2 | GEAR_LT_TWO_FLAG = 1 | Transmission gear is less than two |
| (PRNDL = 5 \|\| PRNDL = 6) | L_FLAG = 1 | Transmission is in low 2 or low 1 gear |
| ENGINE_SPEED < ENG_STALL_RPM | ENG_OFF_FLAG = 1 | The engine is off |
| ENGINE_SPEED < ENG_STALL_RPM | ENG_STALL_FLAG = 1 | The engine has stalled |
| ENGINE_SPEED >= ENG_RESTART_RPM | ENG_RESTART_OKAY_FLAG = 1 | The engine speed is high Enough to restart by just refueling |
| ENGINE_SPEED < ENG_RESTART_RPM | ENG_RESTART_OKAY_FLAG = 0 | The engine speed is not high enough to restart by just refueling |
| CLU_POS_ACTUAL > 218 | DIS_CL_DISENGAGED_FLAG | The disconnect clutch position is open |
| FHS_STATE = 7 & DIS_CL_DISENGAGED | ENG_STOPPED_FLAG = 1 | The engine has been fully disconnected during an engine stop event |
| TRANS_INP_TQ_DD <= TQ_ENG_MAX | BOOST_REQUEST_FLAG = 0 | Operator is not demanding more than engine can provide |
| TRANS_INP_TQ_DD > TQ_ENG_MAX | BOOST_REQUEST_FLAG = 1 | Operator demand is higher than engine can provide, boost required |
| VS < VS_REGEN_OFF (VS < 9 ) | VS_REGEN_OFF_FLAG = 1 | Vehicle speed is too low to allow regen |
| VS > VS_ENG_DRV (VS > 20) | VS_ENG_DRV_FLAG = 1 | Vehicle speed is not low enough to allow engine to be disconnected during regen |
| ENGINE_SPEED < ENG_STALL_RPM for >= 3 min (ENG_OFF_TIMER >= ENERGY_MGT_TIME_LIMIT) | ENG_OFF_TIMER_FLAG = 1 | Engine should be restarted because it has been off too long |
| ENGINE_SPEED < ENG_STALL_RPM for < 3 min (ENG_OFF_TIMER < ENERGY_MGT_TIME_LIMIT) | ENG_OFF_TIMER_FLAG = 0 | Engine does not need to be restarted because it has been off too long |
| KEY_SWITCH = 0 | KEY_OFF_FLAG = 1 | Key is in the off position |
| KEY_SWITCH = 2 | KEY_CRANK_FLAG = 1 | Key is in the crank position |
| MAX_SOURCE_CURRENT = 0 | MAX_SOURCE_CURRENT_ZERO_FLAG = 1 | The battery cannot source any current |
| MAX_SINK_CURRENT=0 | MAX_SINK_CURRENT_ZERO_FLAG = 1 | The battery cannot sink any current |

The combined flags that occur in the state machine are defined as follows:

| Combination Flag: | Combination Flag Definition |
| --- | --- |
| BLEEDING_FLAG | BLEEDING_FLAG<br>& BLEED_ENABLE_FLAG<br>& !MAX_SOURCE_CURRENT-ZERO_FLAG<br>& PEDAL_FLAG<br>& !SA_DISABLED_FLAG<br>& !BRAKE_SWITCH_FLAG |
| BOOST_FLAG | BOOST_REQUEST_FLAG<br>& BOOST_OK_FLAG<br>& BOOST_ENABLE_FLAG<br>& !REVERSE_GEAR_FLAG |
| CHARGE_FLAG | CHARGE_ON_FLAG<br>& CHARGE_ENABLE_FLAG<br>& !MAX_SINK_CURRENT_ZERO_FLAG |
| DISALLOW_BOOST_FLAG | !BOOST_REQUEST_FLAG<br>\|\| BOOST_TIMER_FLAG<br>\|\| SA_DISABLED_FLAG |
| DISALLOW_EN_MGT_FLAG | ENG_ON_FLAG<br>\|\| ENG_COLD_FLAG<br>\|\| !SOC_ENG_OFF_FLAG<br>\|\| ENG_0FF_TIMER_FLAG<br>\|\| AC_MAX_FLAG<br>\|\| !OK_TO_STOP_FLAG |
| ENERGY_MGT_FLAG | !ENG_ON_FLAG<br>& (PEDAL_FLAG \|\| !TRANS_ENGAGED_FLAG)<br>& !ENG_COLD_FLAG<br>& SOC_ENG_OFF_FLAG<br>& !ENG_OFF_TIMER_FLAG<br>& !AC_MAX_FLAG<br>& !SA_DISABLED_FLAG<br>& OK_TO_STOP_FLAG<br>& !MAX_SOURCE_CURRENT_ZERO_FLAG<br>& !REVERSE_GEAR_FLAG<br>& !FLG_SHIFTIN_FLAG |
| IDLE_CRANK_FLAG | ENG_COLD_FLAG<br>\|\| SOC_ENG_RUN_FLAG<br>\|\| ENG_OFF_TIMER_FLAG<br>\|\| AC_MAX_FLAG<br>\|\| KEY_CRANK_FLAG |
| KEY_OFF OR STALL_FLAG | KEY_OFF_FLAG<br>\|\| ENG_STALL_FLAG |
| REGEN_FLAG | !VS_REGEN_OFF_FLAG<br>& !PEDAL_FLAG<br>& REQ_REGEN_FLAG<br>& !REVERSE_GEAR_FLAG |

Other flags include the BRAKE_SWITCH_FLAG (the operator has requested brakes); CRANK_INH_FLAG (all transmission conditions needed to crank the engine are satisfied); and FLAG_SHIFTIN_FLAG (a transmission shift is in progress).

Many of the flags of the state machine of FIG. 2 can be based on calibratable parameters as follows (values given are typical levels only):

During calibration, the following conditions should be preserved: SOC_ENG_RUN<SOC_BOOST_OFF<SOC_ENG_OFF; SOC_ENG_OFF<=SOC_BOOST_OK<SOC_CHARGE_ON; SOC_CHARGE_ON<SOC_CHARGE_OFF<SOC_BLEED_OFF; and SOC_BLEED_OFF<SOC_REGEN_OFF.

The state machine presented in FIG. 2 also has several predetermined assumptions. The regenerative states are pos-

| Parameter | Definition |
|---|---|
| BLEED_ENABLE_FLAG = 1 | Development flag to turn bleed on/off |
| CHARGE_ENABLE_FLAG = 1 | Development flag to turn charge on/off |
| BOOST_ENABLE_FLAG = 1 | Development flag to turn boost on/off |
| REQ_REGEN_FLAG = 1 | Development flag to turn regenerative braking (regen) on/off |
| MOTOR_ONLY_FLAG = 0 | Development flag to allow engine operation or not |
| DIS_CL_CTRL_PARAM = 2 | Development flag for opening, closing, or using the strategy to control the disconnect clutch |
| PEDAL_ON = 5% | Percent accelerator depression used to indicate that the operator is demanding torque at the wheels |
| PEDAL_OFF = 2% | Percent accelerator depression used to indicate that the operator is not demanding torque at the wheels |
| POWER_THRESH_ON = 7 kw | Power threshold used for determining when operator demand is high enough to require the engine to start |
| POWER_THRESH_OFF = 6 kW | Power threshold used for determining when the operator demand is low enough to allow the engine to turn off |
| SOC_REGEN_OFF = 90% | Battery state of charge (SOC) level above which regen is not allowed |
| SOC_BLEED_OFF = 85% | SOC level below which bleed is turned off |
| SOC_CHARGE_OFF = 75% | SOC level above which charging is turned off |
| SOC_CHARGE_ON = 55% | SOC level below which charging is turned on |
| SOC_BOOST_OK = 50% | SOC level above which it is okay to boost |
| SOC_ENG_OFF = 50% | SOC level above which it is okay to turn the engine off |
| SOC_BOOST_OFF = 45% | SOC level below which boost must be turned off |
| SOC_ENG_RUN = 40% | SOC level below which engine cannot be turned off |
| ENG_STALL_RPM =100 RPM | Engine speed below which engine is considered stalled |
| ENG_START_TIME = 30 counts | Time tolerance used during engine starting check |
| ENG_RESTART_RPM = 700 | Engine speed below which engine might not be able to be restarted by just adding fuel |
| ENG_START_SPD_TOL_rpm = 100 rpm | Speed tolerance used during engine starting strategy |
| ENG_START_TQ_TOL_Nm = 5 Nm | Torque tolerance used during engine starting strategy |
| VS_REGEN_OFF = 9 KPH | Vehicle speed below which regen is turned off |
| VS_ENG_DRV = 20 KPH | Vehicle speed below which engine is disconnected during regen |
| BLEED_MAX = 3000 W | Maximum power used during battery bleed |
| CHARGE_MAX = 3000 W | Maximum power used during battery charge |
| BLEED_DELTA_LL = 200 RPM | Breakpoint used in bleed strategy |
| CHARGE_DELTA_LL = 200 RPM | Breakpoint used in charge strategy |
| BLEED_DELTA_UL = 200 RPM | Breakpoint used in bleed strategy |
| CHARGE_DELTA_UL = 200 RPM | Breakpoint used in charge strategy |
| LOW_RPM_CHARGE_TQ = −5 Nm | Maximum torque used to drive the motor in charge mode during low speed operation |
| LOW_RPM_BLEED_TQ = 5 Nm | Maximum torque used to drive the motor in bleed mode during low speed operation |
| MIN_TIME_IN_RUN = 1000 counts | Minimum time that engine will run after a key start event |
| ENERGY_MGT_TIME_LIMIT = 18000 cts. | Maximum time that engine can be off before a forced restart |
| BOOST_TIME_LIMIT = 200 counts | Time over which boost is phased out when the boost state is exited for energy management reasons |
| TQ_SA_MAX = Table(SA_SPEED) | Maximum torque available from the motor |
| TQ_ENG_MAX = Table(ENGINE_SPEED) | Maximum torque available from the engine | sible in all gears. The regenerative states take priority over ENG_COLD_FLAG and ENG_OFF_TIMER_FLAG conditions. In other words, the state machine will not exit the regenerative states to start the engine 20 because engine temperature is below a predetermined threshold (i.e., cold, ENG_COLD_FLAG). The engine 20 will otherwise need to be started when cold. The engine 20 will automatically start when the vehicle operator switches an air-conditioning (AC) system to its maximum setting (AC_MAX_FLAG) and will shut off when the AC_MAX_FLAG condition is removed. No other accessories (other than AC) will automatically and independently require an engine start. In these cases, engine 20 start will occur due to low battery SOC. The regenerative states have higher priority than engine 20 stop states. Applying vehicle brakes exits any speed control states (engine start or engine stop) unless the transmission is not engaged (engine start state only). The ENGINE STOP state 48 is only needed for stopping the engine 20 if there is operator demand such as applying an accelerator. Without any operator demand, going through the regenerative states will stop the engine 20.

And finally, by way of background for the present invention, state independent codes for some of the functions of the state machine of FIG. 2 are as follows. This code supports the definitions of the transitions condition flags above.

```
Engine Off Timer:    if ENG_OFF_FLAG then
                         ENG_OFF_TIMER = ENG_OFF_TIMER + 1
                     Elseif
                         ENG_STARTED_FLAG then
                         ENG_OFF_TIMER = 0
                     endif
                     if ENG_OFF_TIMER >= ENERGY_MGT_TIME_LIMIT
                         then
                         ENG_OFF_TIMER_FLAG = 1
                     else
                         ENG_OFF_TIMER_FLAG = 0
                     endif
Start Timer:         if KEY_CRANK_FLAG then
                         START_TIMER = 0
                     else
                         START_TIMER = START_TIMER + 1
                     endif
                     if START_TIMER > MIN_TIME_IN_RUN then
                         OK_TO_STOP_FLAG = 1
                     else
                         OK_TO_STOP_FLAG = 0
                     endif
Boost Timer:         if BOOST_OFF_FLAG or MAX_SOURCE_CURRENT_ZERO_FLAG
                         then
                         BOOST_TIMER = BOOST_TIMER+1
                     else
                         BOOST_TIMER = 0
                     endif
                     if BOOST_TIMER >= BOOST_TIME_LIMIT
                         BOOST_TIMER_FLAG =1
                     else
                         BOOST_TIMER_FLAG = 0
                     endif
Eng Start Flag Timer: if (ENG_RPM - SPD_SA_DES) < tolerance1
                         and TQ_SA_ACT < tolerance2 then
                         ENG_START_TIMER = ENG_START_TIMER + 1
                     else
                         ENG_START_TIMER = 0
                     endif
                     if ENG_START_TIMER > ENG_START_TIME
                         ENG_STARTED_FLAG = 1
                     else
                         ENG_STARTED_FLAG = 0
                     endif
PEDAL FLAG Set/Reset: if ACCEL_PEDAL > PEDAL_ON then
                         PEDAL_FLAG = 1
                         elseif ACCEL_PEDAL < PEDAL_OFF then
                         PEDAL_FLAG = 0
                         else PEDAL_FLAG = PEDAL_FLAG
                     endif
Operator Demand:     DES_WHL_TQ = f(ACCEL_PEDAL, VS)
                     if GR_CUR <> 0
                     TRANS_INP_TQ_DD =
                     DES_WHL_TQ/(GR_RATIO_FD_RATIO)
                     else
                     TRANS_INP_TQ_DD = 0
                     endif
```

With the preceding background information, the essence of the present invention, the transition among states within the state machine, can now be better understood. Transitions are allowed when a particular exit condition of the current state is satisfied. Transitions are generally prioritized in the current state from highest to lowest. For example, if the controller were in the MOTOR DRIVE state 50, a transition to the OFF state 52 could occur when the transition condition KEY_OFF_FLAG became true. Each flag in the transition conditions shown in FIG. 2 and referenced above represents a logical relationship among the vehicle's three most fundamental functions for efficient management of energy as described above (operator demand, efficient management of energy, and system faults). For example, IDLE_CRANK_FLAG=TRUE can imply that the engine 20 is cold, the battery 26 SOC is low, the calibratable time to keep the engine 20 off has lapsed, there is request for maximum AC, or the key is in the CRANK position.

The unique prioritization of the state representing an operating mode transition first makes a determination based on operator demand, energy management requirements, and system fault occurrences. Highest priority transitions typically are associated with system faults occurrences. For instance, a motor/generator 22 fault can force a transition out of any of the states that depend on motor/generator 22 operation such as the BOOST state 36. Nevertheless, the system can be configured to assign priority of state transitions in any order.

Operator demand is the next level of priority. The state machine is designed to typically satisfy operator torque demands over energy demands or management. For example, the BOOST state 36 is a higher priority state than the BLEED state 34 or CHARGE state 38 since the BOOST state 36 satisfies increased operator demand, whereas the BLEED state 34 and CHARGE state 38 serve energy management functions. Nevertheless, when total system performance is close to being compromised (e.g., low battery 26 state of charge), energy demands or management requirements, generally the third priority, take precedence over operator demand.

The unique prioritization of state transitions within each state is necessary especially when potential transitions are not mutually exclusive. This maintains single-valued exit conditions. The state machine will execute an allowed transition to any higher priority state as soon as the required transition conditions for the new state are satisfied (see, for example, the preceding paragraph). Conversely, if vehicle operating conditions change such that the conditions no longer warrant staying in the current state, the state machine will exit the current state through an allowable transition to the next highest priority state for which the conditions are satisfied. For example, if the state machine in the VSC 32 were in the BOOST state 36 and the vehicle operator removes demand for acceleration (e.g., removing his/her foot from the accelerator), the BOOST_FLAG becomes false. The state machine would transition to the ENGINE DRIVE state 44, but only if the neither the ENERGY_MGT_FLAG nor KEY_OFF_OR_STALL_FLAG were true. By prioritizing the states, the exit transitions from any one state can be defined unambiguously.

FIG. 2 provides all the specific rules that apply to the transitions between each of the vehicle states of the present invention.

The BLEED state 34 can transition to the ENGINE STOP state 48, the ENGINE DRIVE state 44 and the BOOST state 36. The transition from BLEED state 34 to ENGINE STOP state 48 requires the ENERGY_MGT_FLAG or the KEY_OFF_OR_STALL_FLAG to be true. The transition from BLEED state 34 to ENGINE DRIVE state 44 requires the BLEEDING_FLAG, ENERGY_MGT_FLAG, KEY_OFF_OR_STALL_FLAG, and the BOOST_FLAG to all be false. The transition from BLEED state 34 to BOOST state 36 requires the BOOST_FLAG to be true and the KEY_OFF_OR_STALL_FLAG to be false.

The BOOST state 36 can transition to the ENGINE STOP state 44 or the ENGINE DRIVE state 48. The transition from BOOST state 36 to ENGINE STOP state 48 requires the ENERGY_MGT_FLAG or the KEY_OFF_OR_STALL_FLAG to be true. The transition from BOOST to ENGINE DRIVE requires the DISALLOW_BOOST_FLAG to be true while the ENERGY_MGT_FLAG and the KEY_OFF_OR_STALL_FLAG must both be false.

The CHARGE state 38 can transition to the ENGINE STOP state 48, the REGEN HIGH VEL state 42, the ENGINE DRIVE state 44, and the BOOST state 36. The transition from CHARGE state 38 to the ENGINE STOP state 48 requires the ENERGY_MGT_FLAG or the KEY_OFF_OR_STALL_FLAG to be true. The transition from CHARGE state 38 to REGEN HIGH VEL state 42 requires the REGEN_FLAG to be true and either the ENG_RESTART_OKAY_FLAG to be true or the SA_DISABLED_FLAG to be false. Either of these conditions must apply in conjunction with the KEY_OFF_OR_STALL_FLAG to be false. The transition from CHARGE state 38 to ENGINE DRIVE state 44 requires: the BOOST_FLAG, ENERGY_MGT_FLAG, and the KEY_OFF_OR_STALL_FLAG to be false; the CHARGE_OFF_FLAG be true or the CHARGE_ENABLE_FLAG be false or the SA_DISABLED_FLAG be false; and, the REGEN_FLAG be false or the SA_DISABLED_FLAG be true. The transition from CHARGE state 38 to BOOST state 36 requires the BOOST_FLAG to be true and the KEY_OFF_OR_STALL_FLAG to be false.

The REGEN LOW VEL state 40 can transition to the MOTOR DRIVE state 50, the ENGINE START state 46, the OFF state 52, and a limited operation situation (LOS) handled by a separate part of the VSC 32. The transition from REGEN LOW VEL state 40 to MOTOR DRIVE state 46 requires the REGEN_FLAG, ENG_ON_FLAG, KEY_OFF_FLAG, and the SA_DISABLED_FLAG to all be false. The transition from REGEN LOW VEL state 40 to ENGINE START state 46 requires the ENG_ON_FLAG to be true and the REGEN_FLAG, the SA_DISABLED_FLAG, the FLG_SHIFTIN_FLAG, and the KEY_OFF_FLAG to be false. The transition from REGEN LOW VEL state 40 to OFF state 52 requires only the KEY_OFF_FLAG to be true. The transition from REGEN LOW VEL state 40 to LOS requires only the SA_DISABLED_FLAG to be true.

The REGEN HIGH VEL state 42 can transition to the MOTOR DRIVE state 50, the REGEN LOW VEL state 40, the OFF state 52, the LOS state, and the ENGINE_DRIVE state 44. The transition from REGEN HIGH VEL state 42 to MOTOR DRIVE state 50 requires the REGEN_FLAG, the SA_DISABLED_FLAG, the KEY_OFF_OR_STALL_FLAG, the VS_ENG_DRV_FLAG, and the L_FLAG to be false. The transition from REGEN HIGH VEL state 42 to REGEN LOW VEL state 40 requires the REGEN_FLAG and the GEAR_LT_TWO_FLAG to be true; while the VS_ENG_DRV_FLAG, the SA_DISABLED_FLAG, and the KEY_OFF_FLAG are required to be false. The transition from REGEN HIGH VEL state 42 to OFF state 52 only requires the KEY_OFF_FLAG to be true. The transition from REGEN HIGH VEL state 42 to LOS only requires the ENG_STALL_FLAG to be true. The transition from REGEN HIGH VEL state 42 to ENGINE DRIVE state 44 requires the KEY_OFF_OR_STALL_FLAG to be false and either of the following situations—the SA_DISABLED_FLAG to be true while the ENGINE_RESTART_OKAY_FLAG is false, or the situation where the REGEN_FLAG is false while either the L_FLAG or the VS_ENG_DRV_FLAG is true.

The ENGINE DRIVE state 44 can transition to the ENGINE STOP state 48, the REGEN HIGH VEL state 42, the BOOST state 36, the BLEED state 34, or the CHARGE state 38. The transition from ENGINE DRIVE state 50 to ENGINE STOP state 48 requires ENERGY_MGT_FLAG or the KEY_OFF_OR_STALL_FLAG to be true. The transition from ENGINE DRIVE state 44 to REGEN HIGH VEL state 42 requires REGEN_FLAG to be true, the KEY_OFF_OR_STALL_FLAG to be false, and either the ENG_RESTART_OKAY_FLAG to be true or the SA_DISABLED_FLAG to be false. The transition from ENGINE DRIVE state 44 to BOOST state 36 requires the BOOST_FLAG and the DISALLOW_EN_MGT_FLAG to be true, and the KEY_OFF_OR_STALL_FLAG, the SA_DISABLED_FLAG, and the MAX_SOURCE_CURENT_ZERO_FLAG to be false. The transition from ENGINE DRIVE state 44 to BLEED state 34 requires BLEEDING_FLAG to be true, and the CHARGE_FLAG, the DISALLOW_EN_MGT_FLAG, and the KEY_OFF_OR_STALL_FLAG to be false. The transition from ENGINE DRIVE state 44 to CHARGE state 38 requires: the CHARGE_FLAG to be true; the SA_DISABLED_FLAG, the KEY_OFF_OR_STALL_FLAG, the REGEN_FLAG, and the BOOST_FLAG to be false; and either the DISALLOW_EN_MGT_FLAG or the MAX_SOURCE_CURRENT_ZERO_FLAG to be true.

The ENGINE START state 46 can transition to the MOTOR DRIVE state 50, the LOS state, the BLEED state 34, the BOOST state 36, the CHARGE state 38, the ENGINE DRIVE state 44, and the REGEN HIGH VEL state 42. The transition from ENGINE START state 46 to MOTOR DRIVE state 50 requires the BRAKE_SWITCH_FLAG to be true, the TRANS_ENGAGED_FLAG to be true, and the REGEN_FLAG to be false. The transition from ENGINE START state 46 to LOS requires only the SA_DISABLED FLAG to be true. The transition from ENGINE START state 46 to BLEED state 34 requires the BLEEDING_FLAG and the ENGINE_STARTED_FLAG to be true, and the BOOST_FLAG, the CHARGE_FLAG, and the KEY_OFF_OR_STALL_FLAG to be false. The transition from ENGINE START state 46 to BOOST state 36 requires the ENG_STARTED_FLAG and the BOOST_FLAG to be true, and the KEY_OFF_OR_STALL_FLAG to be false. The transition from ENGINE START state 46 to CHARGE state 38 requires the ENG_STARTED_FLAG and the CHARGE_FLAG to be true, and the BOOST_FLAG and the KEY_OFF_OR_STALL_FLAG to be false. The transition from ENGINE START state 46 to ENGINE DRIVE state 44 requires the ENG_STARTED_FLAG to be true, and the BOOST_FLAG, the CHARGE_FLAG, the KEY_OFF_OR_STALL_FLAG, and the BLEEDING_FLAG to be false. The transition from ENGINE START state 46 to REGEN HIGH VEL state 42 requires the BRAKE_SWITCH_FLAG, the TRANS_ENGAGED_FLAG, and the REGEN_FLAG to be true.

The ENGINE STOP state 48 can transition to the LOS state, the OFF state 52, the MOTOR DRIVE state 50, and the REGEN LOW VEL 40 state The transition from ENGINE STOP state 48 to LOS requires only for the SA_DISABLED_FLAG to be true. The transition from ENGINE STOP state 48 to OFF state 52 requires only that the KEY_OFF_FLAG be true. The transition from ENGINE STOP state 48 to MOTOR DRIVE state 50 requires the REGEN_FLAG, the KEY_OFF_FLAG, the SA_DISABLED_FLAG to be false while either the ENGINE_STOPPED_FLAG or the BRAKE_SWITCH_FLAG is true. The transition from ENGINE STOP state 48 to REGEN LOW VEL state 40 requires the REGEN_FLAG to be true, the KEY_OFF_FLAG and the SA_DISABLED_FLAG to be false and either the ENGINE_STOPPED_FLAG or the BRAKE_SWITCH_FLAG is true.

The MOTOR DRIVE state 50 can transition to the LOS state, the OFF state 52, the ENGINE START state 46, and the REGEN LOW VEL state 40. The transition from MOTOR DRIVE state 50 to LOS only requires the SA_DISABLED_FLAG to be true. The transition from MOTOR DRIVE state 50 to OFF state 52 requires only the KEY_OFF_FLAG to be true. The transition from MOTOR DRIVE state 50 to ENGINE START state 46 requires the FLG_SHIFTIN_FLAG, the SA_DISABLED_FLAG and the KEY_OFF_FLAG to be false and either of the following situations: the ENG_ON_FALG is true, or the situation where the IDLE_CRANK_FLAG is true, REGEN_FLAG is false while either the BRAKE_SWITCH_FLAG or TRANS_ENGAGED_FLAG are false. The transition from MOTOR DRIVE state 50 to REGEN LOW VEL state 40 requires the REGEN_FLAG to be true, the SA_DISABLED_FLAG to be false, and the KEY_OFF_FLAG to be false.

Finally, the OFF state 52 can transition to the ENGINE START state 46 when the KEY_CRANK_FLAG is true and the CRANK_INH_FLAG is false.

The above-described embodiment of the invention is provided purely for purposes of example. Many other variations, modifications, and applications of the invention may be made.

We claim:

1. A vehicle system controller for a vehicle having an engine, a motor/generator, and subsystem controllers, the vehicle system controller comprising:
   a state machine having a plurality of predefined states representing vehicle operating modes, the predefined states including a motor drive state, the motor drive state representing a vehicle operating mode wherein the motor/generator provides all driveline torques;
   a set of rules defining logical relationships between each of the plurality of predefined states; and
   a set of commands unique to each state supplied to the subsystem controllers to achieve desired vehicle functionality within the states and to transition between the plurality of predefined states.

2. The controller of claim 1 wherein the plurality of predefined states representing operating modes are prioritized according to operator demands, energy management requirements, and system fault occurrences.

3. The controller of claim 2 wherein said system fault occurrences are defined as a first priority, operator demands are a second priority, and energy demands are a third priority.

4. The controller of claim 2 wherein said system fault occurrences are defined as a first priority, energy demands are a second priority in the event system performance is being compromised, and operator demands are a third priority.

5. The controller of claim 1 wherein the set of rules further comprises at least one of a plurality of transition flags wherein each transition flag of the plurality of transition flags is representative of a logical relationship associated with operator demand, efficient management of energy and system faults.

6. The controller of claim 5 wherein each of the plurality of transition flags are true or false depending on vehicle operating conditions, operator demand, and system fault status, and wherein the predefined states further include two different regenerative states, and the transition flags for a transition from the motor drive state to one of the regenerative states includes a KEY_OFF_FLAG, a REGEN_FLAG, and an SA_DISABLED_FLAG.

7. The controller of claim 1 wherein the plurality of predefined states representing operating modes are defined as BLEED state, BOOST state, CHARGE state, REGEN LOW VEL state, REGEN HIGH VEL state, ENGINE DRIVE state, ENGINE START state, ENGINE STOP state, MOTOR DRIVE state, and OFF state.

8. A method for controlling a vehicle having an engine, a motor/generator, and subsystem controllers, the method comprising:

defining a plurality of states in a state machine wherein each of the plurality of states represents an operating mode for the vehicle, the plurality of states including a motor drive state, the motor drive state representing a vehicle operating mode wherein the motor/generator provides all driveline torques;

defining a set of rules representing logical relationships between each of the plurality of states; and supplying a set of commands unique to each state to the subsystem controllers to achieve desired vehicle functionality within the states and to transition between the plurality of states.

9. The method of claim 8 further comprising the step of prioritizing the plurality of states based on operator demands, system fault occurrences, and energy management requirements.

10. The method of claim 9 wherein the step of prioritizing the plurality of states further comprises the steps of:

defining the system fault occurrences as a first level priority;

defining the operator demands as a second level priority; and defining the energy management occurrences as a third level of priority.

11. The method of claim 9 wherein the step of prioritizing the plurality of states further comprises the steps of:

defining the system fault occurrences as a first level priority;

defining the energy management occurrences as a second level of priority in the event vehicle performance is being compromised; and defining the operator demands as a third level of priority.

12. The method of claim 8 wherein the step of defining a set of rules further comprises the step of defining a plurality of transition flags, each of the transition flags being representative of a logical relationship associated with operator demand, efficient management of energy and system faults.

13. The method of claim 12 wherein each of the plurality of transition flags are true or false depending on vehicle operating conditions, operator demand, and system fault status, and wherein the plurality of states further includes two different transition states, and the step of defining a plurality of transition flags further comprises defining a KEY_OFF_FLAG, a REGEN_FLAG, and an SA_DISABLED_FLAG for a transition from the motor drive state to one of the regenerative states.

14. The method of claim 8, wherein the step of defining a plurality of states further comprises defining a BLEED state, BOOST state, CHARGE state, REGEN LOW VEL state, REGEN HIGH VEL state, ENGINE DRIVE state, ENGINE START state, ENGINE STOP state, MOTOR DRIVE state, and OFF state.

15. A vehicle system controller for a vehicle having an engine, a motor/generator, and subsystem controllers, the vehicle system controller comprising:

a state machine having a plurality of predefined states representing vehicle operating modes, the predefined states including two different regenerative states, the two different regenerative states representing two different vehicle operating modes at least partly dependent on vehicle velocity;

a set of rules defining logical relationships between each of the plurality of predefined states; and a set of commands unique to each state supplied to the subsystem controllers to achieve desired vehicle functionality within the states and to transition between the plurality of predefined states.

16. The controller of claim 15 wherein the plurality of predefined states representing operating modes are prioritized according to operator demands, energy management requirements, and system fault occurrences.

17. The controller of claim 16 wherein said system fault occurrences are defined as a first priority, operator demands are a second priority, and energy demands are a third priority.

18. The controller of claim 16 wherein said system fault occurrences are defined as a first priority, energy demands are a second priority in the event system performance is being compromised, and operator demands are a third priority.

19. The controller of claim 15 wherein the set of rules further comprises at least one of a plurality of transition flags wherein each transition flag of the plurality of transition flags is representative of a logical relationship associated with operator demand, efficient management of energy and system faults.

20. The controller of claim 15 wherein the plurality of predefined states representing operating modes are defined as BLEED state, BOOST state, CHARGE state, REGEN LOW VEL state, REGEN HIGH VEL state, ENGINE DRIVE state, ENGINE START state, ENGINE STOP state, MOTOR DRIVE state, and OFF state.

* * * * *